Dec. 14, 1965  J. W. HOWARD  3,222,933
PRESSURE GAUGE FOR A PRESSURIZED VESSEL
Original Filed Nov. 16, 1960

INVENTOR.
JOHN W. HOWARD
BY
*Elliott & Pastoriza*
ATTORNEYS

United States Patent Office 3,222,933
Patented Dec. 14, 1965

3,222,933
PRESSURE GAUGE FOR A PRESSURIZED VESSEL
John W. Howard, 475 El Medio, Pacific Palisades, Calif.
Continuation of application Ser. No. 69,716, Nov. 16, 1960. This application June 4, 1964, Ser. No. 374,879
6 Claims. (Cl. 73—418)

The present application is a continuation of Serial No. 69,716, filed November 16, 1960, now abandoned, under the same title.

This invention generally relates to pressurized vessels and associated pressure gauges, and more particularly concerns an improved construction for a pressurized vessel designed for combined co-functioning with an improved structure for a pressure gauge. Although the pressure gauge included as a part of the present invention may be employed in other applications, it is primarily designed for mounting in a wall or sidewall of an improved pressurized vessel, according to the present invention. It is, therefore, towards this combination that the specification will be directed.

For descriptive purposes, the pressurized vessel may be considered in one form to be a fire extinguisher tank of the pressurized type (such as a presurized water extinguisher), wherein a visual indication must be given to ascertain that the extinguisher is in proper operating condition within a given pressure range. Usually, for this purpose, a pressure gauge is mounted in the head assembly of the fire extinguisher to indicate the particular pressure of the extinguishing agent within the tank.

Such conventional pressure gauges are of the usual construction and include an operating mechanism, dial, glass, and cylindrical casing housing same. The casing, in turn, is coupled through a fitting to a drilled and tapped opening in the head assembly valve body or forging.

Although such pressure gauges have operated satisfactorily over a long period of time and are adequate for the functions desired, it will be appreciated that they are relatively expensive, susceptible of breakage, and detract from the overall appearance of the extinguisher. Furthermore, such gauges require extra care relative to the mounting, shipping, and re-charging of the extinguisher. Thus, the pressure gauge must be visible and free of protruding structures when the fire extinguisher is mounted; also, the gauge must be properly protected during packaging and shipment to avoid damage thereto.

Also, with conventional pressure gauges mounted in the head assembly of a fire extinguisher tank or equivalent pressure vessel, when the head assembly is removed for re-charging, for example, of the extinguisher, the pressure gauge may be damaged or inadvertently broken through mishandling.

It is, therefore, one object of the present invention to provide an improved pressurized vessel and associated pressure gauge, in which the vessel and gauge are cooperatively constructed such that the gauge may be mounted flush within the sidewalls of the presurized vessel.

Another object of the present invention is to provide an improved pressurized vessel and associated pressure gauge, in which the particular means for mounting of the gauge in the pressurized vessel enable a more simplified and economical construction of the pressure gauge as such without requiring any appreciable increase in the cost of the pressurized vessel.

Another object of the present invention is to provide an improved pressure gauge comprised of a minimum number of parts, which may be economically fabricated and assembled, and yet which may be mounted in such a manner in a pressurized vessel that it will not be susceptible to damage or breakage.

A still further object of the present invention is to provide an improved pressure gauge which may be manufactured with relatively small dimensions, and yet which will be sufficiently rugged to withstand relatively high pressures over a long period of time without deterioration and with relative accuracy.

A still further object of the present invention is to provide an improved pressurized fire extinguisher tank and associated pressure gauge for mounting in the sidewalls therein, in which the pressure gauge is constructed of a minimum number of parts and in which the sidewalls of the fire extinguisher tank, as such, co-function with the gauge as a means of securely maintaining the gauge in coupled relationship to the tank.

These and other objects and advantages of the present invention are generally achieved by providing in an improved pressurized vessel, the combination comprising a wall of said vessel defining a threaded aperture therethrough with the wall further defining an outer recessed portion encircling and adjacent the aperture.

In accordance with another feature of the present invention, a pressure gauge is designed for mounting in the aperture, and the gauge includes a dial portion designed to be mounted flush within the recessed wall portion of the pressurized vessel.

A better understanding of the present invention will be had by reference to the drawings, showing merely illustrative embodiments, and in which.

Figure 1:
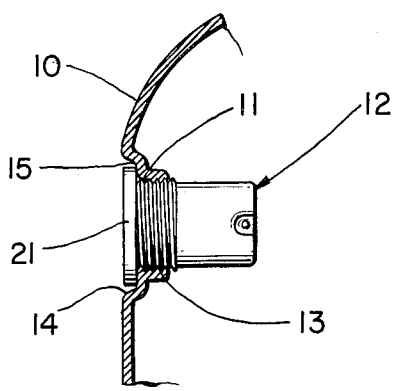
FIGURE 1 is a partial sectional view through a pressurized vessel or fire extinguisher tank illustrating the improved construction thereof, and the co-functioning of said improved construction with an improved pressure gauge, all in accordance with the present invention.

Referring now to the view of FIGURE 1, there is shown a sidewall or wall 10 of a pressurized vessel, which may comprise a fire extinguisher tank or equivalent structure. The wall 10 defines therein an opening 11 designed for mounting of a pressure gauge 12.

The opening 11 in the wall 10 is defined more particularly by a threaded flange 13; the flange 13 extends inwardly from a recessed portion 14 of the sidewalls 10. The recessed portion 14 includes a relatively vertically extending annular face, as seen in the view of FIGURE 1, to generally define a ring shaped mounting seat within the normal contour of the outer surface of the tank or vessel sidewalls 10.

Figures 2, 3:
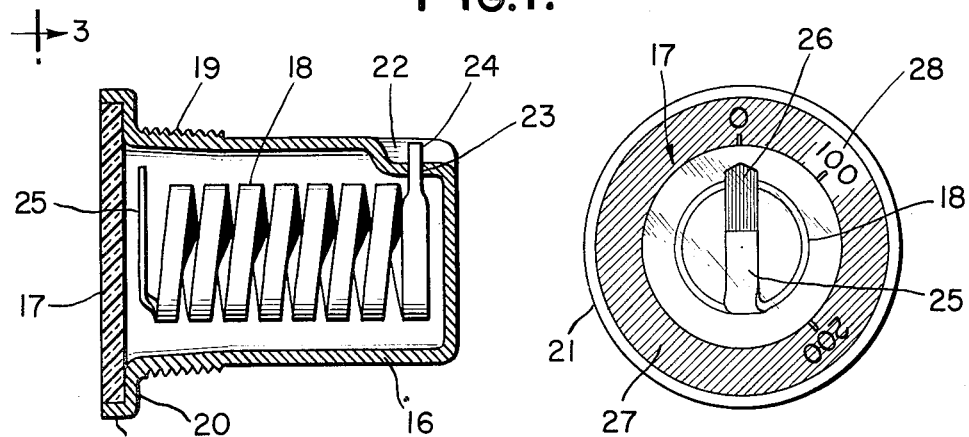
FIGURE 2 is an enlarged sectional view of the pressure gauge shown in FIGURE 1, rotated ninety degrees with respect to the view of FIGURE 1.
FIGURE 3 is an end view taken in the direction of the arrows 3—3 of the pressure gauge shown in FIGURE 2.

The construction of the pressure gauge 12, as shown in FIGURE 1, may be more clearly understood by reference to FIGURE 2. In FIGURE 2, it will be seen that the pressure gauge 12 includes a generally cylindrical casing 16, preferably formed of stainless steel, which is designed to retain at the outer end thereof a crystal or dial member 17. The casing 16 is also adapted to retain co-axially therein a helical Bourdon tube 18. Thus, it is to be noted that the pressure gauge consists only of three structural members: a casing 16; a dial member 17; and, a Bourdon tube 18.

The casing 16 is provided with tapered threading 19 proximate its outer end (the lefthand portion as viewed in FIGURE 2) for mating with the threading 13 in the sidewall 10 of the tank. The casing 16 is further provided with an increased diameter portion 20 which is integrally formed with a peripheral flange 21 designed for mounting of the dial member 17 therein.

The flanged portion 21, as indicated in FIGURE 1, is designed to be received flush within the depressed or recessed portion 14 of the wall 10 of the pressurized vessel. In such a construction, the pressure gauge 12 does not protrude from the pressurized vessel, whereby the usual problems relative to care of the gauge from the standpoint of shipping, mounting, re-charging, and the like are eliminated while at the same time enabling a more economical structure.

The dial member or crystal 17 is preferably a plastic member, for example formed of tenite butyrate plastic or the like, which is cemented against the inner faces of the increased diameter portion 20 and the peripheral flange 21.

The casing at its opposite end is provided in a sidewall portion thereof with a depressed portion 22 in the form of an angular groove or the like within which is defined an opening 23 extending through the casing in alignment with one end of the Bourdon tube 18. An inlet 24 communicates with the Bourdon tube 18, the latter being appropriately brazed or otherwise secured to the grooved portion 22 of the casing 16. The other end of the helical Bourdon tube 18 is twisted ninety degrees and shaped to form a pointer element 25, as more clearly shown in the view of FIGURE 3. The pointer element 25 may be appropriately colored at 26. Thus, the Bourdon helical tube 18 is only coupled at its inlet 24 to the casing 16 and is otherwise freely co-axially disposed within the interior of the gauge casing 16.

Further referring to FIGURE 3, it will be seen that the dial member 17 includes an outer annular portion 27 of dark colored plastic material, for example, blue coloring such that lightened areas as indicated at 28 about the numeral designation "100" will be clearly indicated by contrast. The inner circular portion of the dial member 17 is not colored so as to leave a visible area through which the pointer member 25 of the Bourdon tube 18 may be viewed.

The structural assembly and operation of the improved pressure vessel and associated pressure gauge, according to the present invention, will be evident from the foregoing description. In view of the threading on the exterior of the casing 16 of the gauge 12, it is merely necessary to thread the gauge 12 into the threaded flange 13 of the casing 10. In response to pressurized fluid within the vessel, the Bourdon tube 18 will tend to change its elliptical cross section to a circular cross section and thereby angularly rotate the pointer 25, 26 at its free end to, in turn, give a pressure reading, according to the pressure of the contents of the vessel.

It will be noted that with the present construction, the case itself functions as a means of coupling the gauge to the pressurized vessel. Furthermore, the pointer is formed as an integral part of the pressure indicating element, in this instance the Bourdon tube 18.

Figure 4:
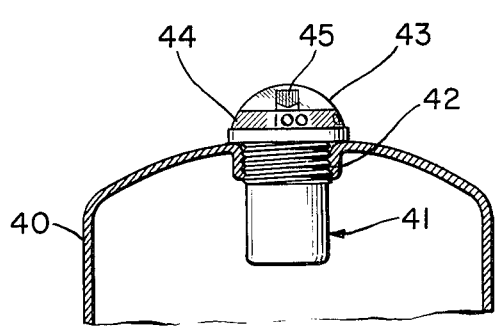
FIGURE 4 is a view of a modification of the pressure gauge illustrated in FIGURE 2, in which the pressure gauge is illustrated in a construction for mounting in the end wall of a pressurized vessel; and, FIGURE 5 is a partial view of the pressure gauge shown in FIGURE 4 rotated ninety degrees from the position as indicated in FIGURE 4.
Figure 5:
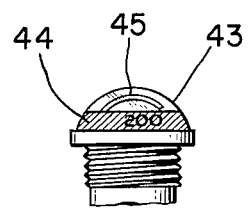

In another embodiment, in which the pressure gauge is to be mounted in the end wall of a vessel, a modified construction may be used as indicated in FIGURES 4 and 5.

Thus, in FIGURE 4, there is shown a pressurized vessel 40 adapted to have mounted therein a pressure gauge 41. Towards this end, the pressure vessel 40 may include a threaded opening 42 designed to cooperate with appropriate threading on the exterior of the gauge 41 in the same manner as the embodiment of the gauge heretofore described.

In this instance, however, the gauge is provided with a dome shaped dial member 43, which includes an outer annular colored portion 44. The dial member 43 may be mounted in the gauge 41 in exactly the same manner as the member 17 is mounted in the casing 16 in conjunction with the gauge described relative to FIGURES 1–3.

Furthermore, in this type of construction, the free end of the Bourdon tube is not only twisted ninety degrees to function as a pointer 45, as shown in FIGURE 4, but also is bent into an arcuate shape as indicated in FIGURE 5.

With such an embodiment, the pointer 45 and its position relative to the area 44 and indicia imposed thereon may be ascertained visually from the side of the vessel 40 without viewing the vessel downwardly. Of course, in this structure, one of the features of the present invention relative to flush mounting is not included. For this reason, the embodiment shown in FIGURES 1–3 is preferred.

It will be appreciated, however, that various modifications and changes may be made with respect to the improved construction for a pressurized vessel and associated pressure gauge as heretofore described without departing from the spirit and scope of the invention as set forth in the following claims.

What is claimed is:

1. An improved pressure gauge for mounting in the sidewalls of a pressurized vessel, said pressure gauge comprising: a casing; an integral combined lens and dial member mounted in and closing off one end of said casing; a spirally turned tube coupled to the other end of said casing and extending coaxially within said casing towards said dial member; means defining an opening in said other end of said casing sealably retaining one end of said tube; means formed on the peripheral sidewalls of said casing for coupling to the sidewalls of said pressurized vessel, and, a pointer formed by the other end of said spirally turned tube, said pointer being positioned to extend diametrically across said casing and being designed to function with said dial member.

2. An improved pressure gauge for mounting in the sidewalls of a pressure vessel, said gauge comprising: a cylindrical casing; a combined integral lens and dial member mounted in and closing off one end portion of said casing; a spirally turned tube coaxially positioned within and coupled to the other end of said casing; means defining an opening in said other end of said casing sealably retaining one end of said tube; threading on the outer periphery of said casing for coupling to the sidewalls of said pressurized vessel; and, an integral pointer formed by the free end of said tube, said pointer being diametrically positioned across said casing over said tube and co-functioning with said lens and dial member.

3. An improved pressure gauge for mounting in the sidewalls of a pressurized vessel, said gauge comprising: a casing; an integral dial and lens member; said casing defining at one end thereof a peripheral flange for mounting of said dial and lens member therein; a spirally turned tube coaxially positioned within and coupled to the other end of said casing; an opening in said other end of said casing sealably retaining one end of said tube; means on said casing for coupling to the sidewalls of said pressurized vessel; and, an integral pointer formed by the other end of said tube, said integral pointer being positioned to extend diametrically across said casing and overlie said spirally turned tube.

4. The subject matter, according to claim 3, in which the outer periphery of said casing is formed with threads for coupling to the sidewalls of said pressurized vessel.

5. The subject matter, according to claim 3, in which said dial and lens member is cemented within said one end of said casing.

6. An improved pressure gauge according to claim 3, in which said dial member is provided with outer annular scale markings and an inner circular transparent portion through which said pointer defined by the other end of said tube may be viewed.

References Cited by the Examiner

UNITED STATES PATENTS

| | | | |
|---|---|---|---|
| 685,304 | 10/1901 | Sigafoos | 169—31 |
| 1,207,393 | 12/1916 | Gammeter | 169—31 |
| 2,447,335 | 8/1948 | Heilig | 73—406 X |
| 2,497,702 | 2/1950 | Terpak | 116—70 X |
| 2,929,249 | 3/1960 | Lindsay | 73—418 |
| 3,069,910 | 12/1962 | Hastings | 73—411 |

RICHARD C. QUEISSER, *Primary Examiner.*